United States Patent [19]

Matsuura et al.

[11] 4,442,806
[45] Apr. 17, 1984

[54] VALVE DRIVING CONTROL APPARATUS IN AN INTERNAL COMBUSTION ENGINE

[75] Inventors: Masaaki Matsuura, Tokyo; Yoshikatsu Nokano, Kawagoe, both of Japan

[73] Assignee: Honda Giken Kogyo Kabushiki Kaisha, Tokyo, Japan

[21] Appl. No.: 445,637

[22] Filed: Nov. 30, 1982

[30] Foreign Application Priority Data

Dec. 3, 1981 [JP] Japan .................................. 56-194815

[51] Int. Cl.$^3$ ......................... F01L 1/34; F02D 13/06
[52] U.S. Cl. .............................. 123/198 F; 123/90.16; 123/90.27
[58] Field of Search ............. 123/198 F, 90.15, 90.16, 123/90.22, 90.23, 90.27

[56] References Cited

U.S. PATENT DOCUMENTS

| 3,641,988 | 2/1972 | Torazza et al. | 123/90.16 |
| 3,911,879 | 10/1975 | Altmann | 123/90.16 |
| 4,203,397 | 5/1980 | Soeters | 123/198 F |
| 4,237,832 | 12/1980 | Hartig et al. | 123/198 F |
| 4,245,596 | 1/1981 | Bruder et al. | 123/198 F |
| 4,256,070 | 3/1981 | Mueller | 123/198 F |
| 4,284,042 | 8/1981 | Springer | 123/198 F |
| 4,285,310 | 8/1981 | Takizawa et al. | 123/90.16 |
| 4,336,775 | 6/1982 | Meyer | 123/198 F |
| 4,337,738 | 7/1982 | Bubniak et al. | 123/198 F |
| 4,363,300 | 12/1982 | Honda | 123/90.27 |

Primary Examiner—Ira S. Lazarus
Attorney, Agent, or Firm—Pollock, Vande Sande and Priddy

[57] ABSTRACT

A valve driving control apparatus in an internal combustion engine comprises a plurality of power cylinders each having a plurality of intake and exhaust reciprocating valves which are made operative or inoperative depending upon the load conditions of the engine. This apparatus selectively makes the valves operative or inoperative according to a control signal which is generated in a control circuit in response to the engine rotational speed. The switching operation of the valve is performed in a manner that the switching operation from operative state to inoperative state and the switching operation from inoperative state to operative state are performed respectively at two different engine rotational speeds; that is, the change-over operation of the operative/inoperative state of the valve complies with a hysteresis characteristic provided by the control circuit.

5 Claims, 8 Drawing Figures

VALVE DRIVING CONTROL APPARATUS IN AN INTERNAL COMBUSTION ENGINE

BACKGROUND OF THE INVENTION

The present invention relates to a valve driving control apparatus for driving intake and exhaust valves for an internal combustion engine, more particularly to a valve driving apparatus for an internal combustion engine which comprises a plurality of power cylinders each having a plurality of intake and exhaust reciprocating valves.

The applicant of the present invention has already proposed a valve driving system for providing an efficient drivability over the whole range of the rotational speed i.e., high to low of the engine, in which each of the power cylinders is equipped with a plurality of intake and exhaust valves, where in at least one of the intake valves and at least of the exhaust valves are switched either operative or inoperative depending upon the load conditions of the engine.

In such a valve driving system as mentioned above, in which the change-over operation of the operative or inoperative state of the valve is performed at a predetermined rotational speed of the engine, especially when the engine has been driven near the above-stated predetermined rotational speed, such a switching operation occurs so frequently. As a result, the control part of the valve driving mechanism will be gradually deteriorated and which may cause the production of unpleasant noises. Furthermore, comfortableness of the motor vehicle which is powered by this type of internal combustion engine may be deteriorated by the output fluctuation due to a difference of outputs before and after the switching of the valve operation. In addition, there was a defect that the engine power reduces at the rotating speed at which the above-described switching operation of the valves is performed.

SUMMARY OF THE INVENTION

If is therefore an object of the invention to provide a valve driving control apparatus for controlling the change over of the operative/inoperative state of the reciprocating valves in response to the rotational speed of the internal combustion engine, in which the number of switching operations is reduced when the engine output fluctuates when the engine rotational speed is around the threshold rotational speed at which the switching operation is performed, thereby preventing the deterioration of the apparatus and preventing the production of the noise. Another object of the invention is to increase the service life of the apparatus and to provide an apparatus which can secure the smoothness and a high power of the engine at the switching points.

According to the present invention, the valve driving control apparatus has a hysteresis characteristic, that is to say, the rotational speed upon which the valve operation is shifted from the operative state to the inoperative state is different from the rotational speed upon which the valve operation is shifted from the inoperative state to the operative state.

BRIEF DESCRIPTION OF THE DRAWINGS

The invention will now be better understood from the following description with reference to the accompanying drawings, in which.

DESCRIPTION OF THE PREFERRED EMBODIMENT

Figure 1:
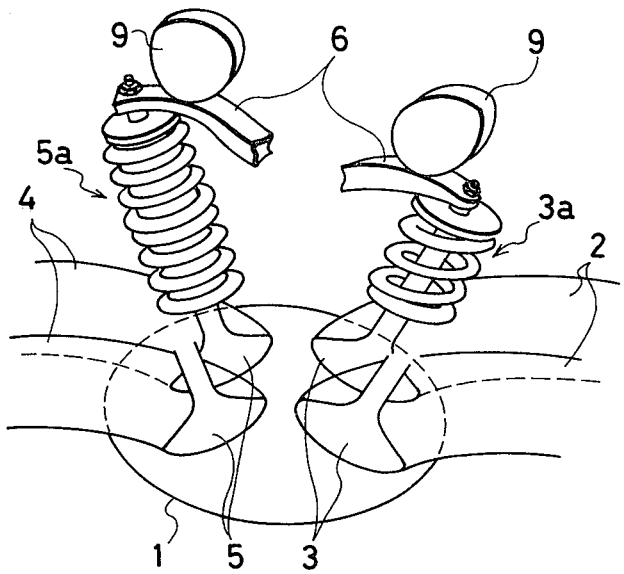
FIG. 1 is a perspective view illustrating a part of an internal combustion engine which is equipped with a plurality of intake and exhaust valves to be driven by the valve driving control apparatus of the invention.
Figure 2:
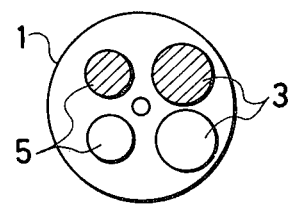
FIG. 2 is a view showing an arrangement of the intake/exhaust valve assembly of FIG. 1.

FIG. 1 shows a part of the internal combustion engine which is equipped with two intake valves and two exhaust valves per each power cylinder. A reference numeral 1 denotes a power cylinder in which there are arranged in parallel two intake valves 3 which open and close two corresponding intake ports 2 which open into the power cylinder 1, and two exhaust valves 5 which open and close two corresponding exhaust 4. The intake valves 3 and the exhaust valves 5 are respectively urged, by appropriate bias mechanisms 3a and 5a so as to close the intake and exhaust ports 2 and 4. These valves are driven by means of cam followers 6 associated with cams 9, which are engaged with the top portions of the respective valve assemblies so that the valves can intermittently open in accordance with the rotation of a crankshaft (not shown). A support end portion (not shown) of each of the cam followers 6 is pivotally supported by means of an appropriate support mechanism which enables the switching operation between the operative and inoperative states, i.e., one of the intake valves 3 and or one of the exhaust valves 5 are controlled operative or inoperative in response to the driving conditions of the engine as shown in FIG. 2.

Figure 3:
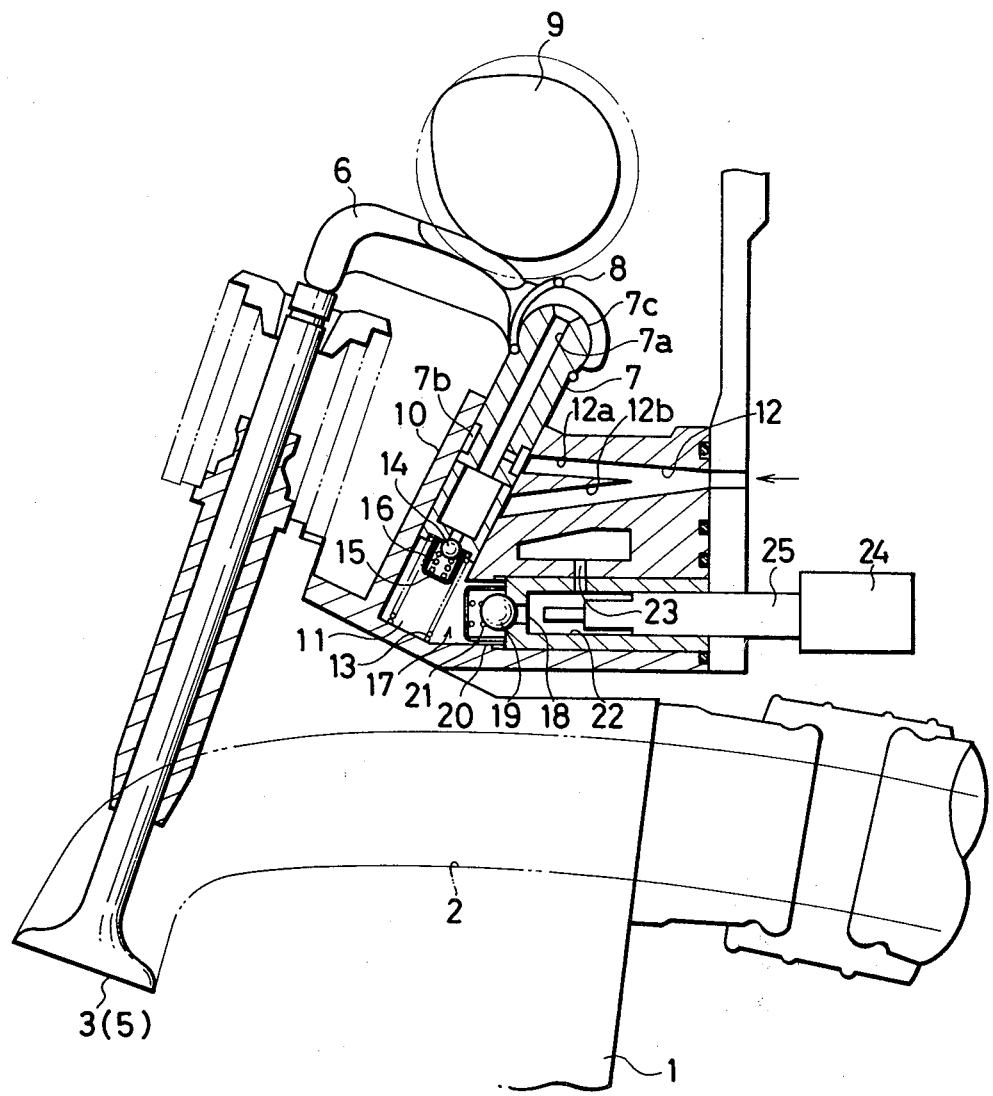
FIGS. 3 and 4 are sectional views showing an embodiment of the valve driving mechanism according to the valve driving control apparatus of the invention.
Figure 4:
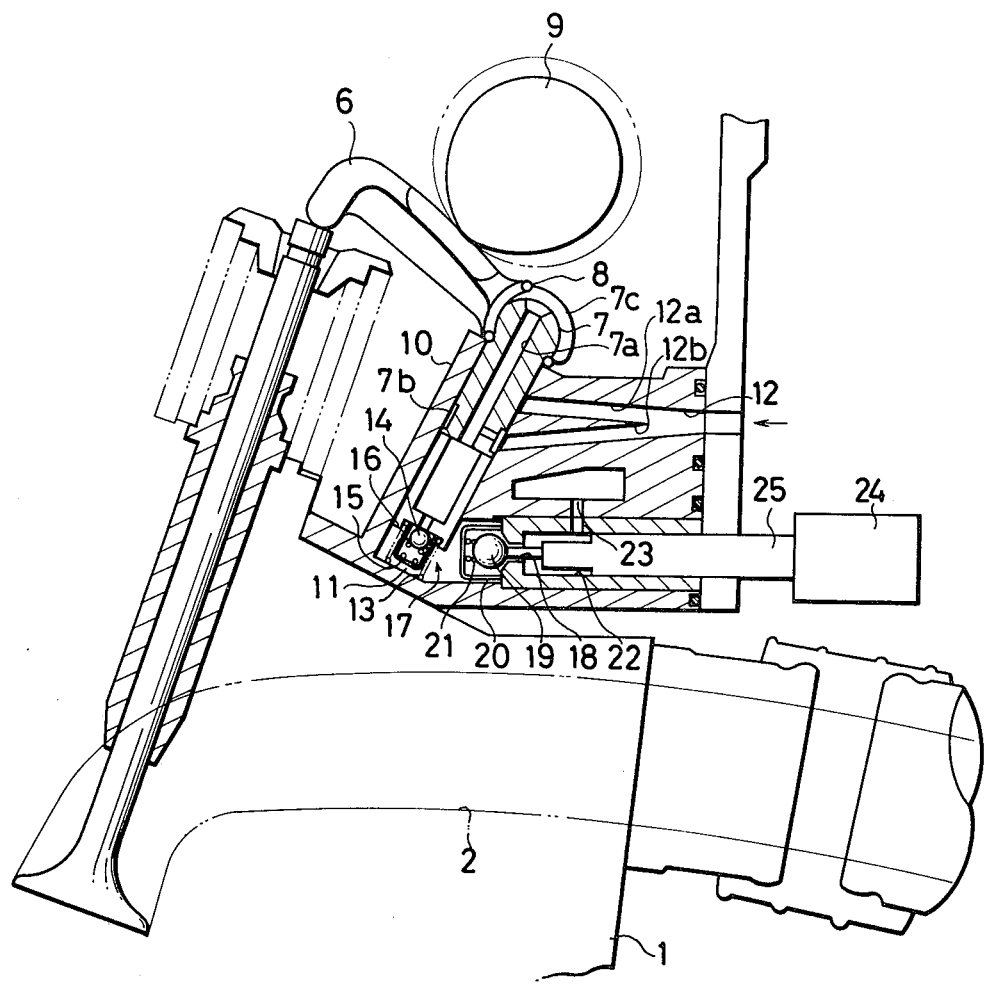

FIGS. 3 and 4 show an example of the valve driving mechanism which is utilized to drive either one of the intake valves 3 or the exhaust valves 5 which will be made inoperatiave. This valve driving mechanism is disclosed in the Japanese Patent application No. 56-176655 was filed by the same applicant of the present invention. FIG. 3 shows the operative state of the valve and FIG. 4 shows the inoperative state of the valve respectively. As shown in FIGS. 3 and 4, a supporting end portion of the cam follower 6 is pivotally supported by a spherical head 7c of a piston plunger 7. A spring 8 is placed at this end portion of the cam follower 6 and wound around the neck portion of the spherical head 7c of the piston plunger 7 so as to secure this pivotally supporting end. The cam follower 6 contacts at its slipper portion 6a with the cam 9. The cam 9 is rotated in synchronization with the engine revolution to intermittently press the cam follower 6 down, thereby the cam follower 6 intermittently opens the above-mentioned reciprocating valve.

The piston plunger 7 is slidably inserted into a fixed control cylinder 10 to form a pressure chamber 11. A hydraulic passageway 7a is formed in the piston plunger 7 and axially passes there through. The hydraulic passageway 7a communicates with an annular groove 7b formed in the side wall surface of the piston plunger 7. A hydraulic pressure supplying passageway 12 opens at two points on the side wall of the fixed control cylinder 10. That is, the wall of the cylinder 10 is further formed with first and second hydraulic passageways 12a and 12b which are commonly continuously communicating with a suitable source (not shown) of a pressurized fluid and terminating ends of the first and second passageways 12 and 12b are disposed in such a manner as to open into the annular groove 7b in the piston plunger 7 when the piston plunger 7 assumes to be at predetermined first and second axial positions, i.e. the asceded and descended positions relative to the fixed cylinder 10 as shown in FIGS. 3 and 4, respectively. Consequently, the fluid from the above-mentioned hydraulic source (not shown) is always supplied to the hydraulic passageway 7a. The piston plunger 7 is urged in the direction of the cam 9 by a plunger spring 13 disposed in the pressure chamber 11. The piston plunger 7 is formed with a valve sheet at its opening portion of the hydraulic passageway 7a at the upper end of the pressure chamber 11. A spherical valve body 14 is seated on this valve sheet by a small spring 16 provided in a retainer 15, defining a first one-way check valve means adapted to provide one-way communication from the axial hydraulic passageway 7a of the piston plunger 7 to the pressure chamber 11 of the fixed control cylinder 10. A hydraulic exhaust opening 17 is formed on the side wall of the cylinder 10 which forms the pressure chamber 11. This hydraulic exhaust opening 17 extends in approximately radial direction of the cylinder 10 and communicates with a nozzle 18. The nozzle 18 is also provided with a spherical valve body 19 which is urged by a spring 21 housed in a cup-shaped retainer 20 and seated on the nozzle 18. Thus, a second one-way check valve means is defined. The nozzle 18 is communicated with a drain port 23 through a buffer chamber 26 which is formed in a guide cylinder 22. The guide cylinder 22 is equipped with a control plunger 25 which is driven by an electromagnetic solenoid 24. The plunger 25 has an elongated tip portion adapted to be axially inserted into the nozzle 18 upon exciting the electromagnetic solenoid 24 and pushes the spherical valve body 19 against the biasing force of the spring 21 to open the second check valve means.

In the valve driving apparatus according to the present invention with such a construction as described above, the electromagnetic solenoid 24 is de-energized when the reciprocating valve is to be made operative. In this state, the hydraulic fluid is supplied to the hydraulic passageway 7a through the hydraulic pressure supplying passageway 12, the fluid in the hydraulic passageway 7a is supplied to the pressure chamber 11 through the first check valve. At this time, since the nozzle 18 has been blocked by the spherical valve body 19, the piston plunger 7 pivotally supports the cam follower 6, against the pressure of the cam follower 6. As the consequence, the reciprocating valve body is intermittently pressed down in response to the rotation of the cam 9, thereby to effect the operation of the reciprocating valve.

On the other hand, when the reciprocating valve is to be made inoperative, the electromagnetic solenoid 24 is energized, so that the control plunger 25 is axially inserted into the nozzle 18 and further pushes the spherical valve body 19 to open the second check valve. In this state, the fluid in the pressure chamber 11 is drained from the hydraulic exhaust opening 17 through the nozzle 18, buffer chamber 26 in the guide cylinder 22 and further through the drain port 23 as shown in FIG. 4. Consequently, the piston plunger 7 sinks in the cylinder 10 when the cam follower 6 is pressed down by the cam 9 because the supporting force of the piston plunger 7 is no more present. The reciprocating valve 3 is therefore made inoperative as shown in FIG. 4. At this time, the piston plunger 7 is so pushed up by the plunger spring 13 in the direction of the cam 9 that the cam follower 6 always contacts at its slipper portion 6a with the cam 9. In this state, the hydraulic fluid which flows into or out of the pressure chamber 11 functions as a hydraulic damper for absorbing the vibration of the piston plunger 7. The resilient force of the plunger spring 13 has been set so weak that it won't allow the cam follower 6 open the reciprocating valve.

In order to return the valve body from the inoperative state to the operative state, the electromagnetic solenoid 24 is de-energized. The control plunger 25 is then returned to a position to close the second check valve and the hydraulic pressure in the pressure chamber 11 rapidly increases, so that the piston plunger 7 returns to a position to make the valve operative as shown in FIG. 3. When the control plunger 25 returns and the piston plunger 7 is pushed up, the buffer chamber 26 in the guide cylinder 22 acts temporarily as the auxiliary oil vessel, which is advantageous for providing a rapid ascending motion of the piston plunger 7.

The above-described valve driving mechanism drives the intake or exhaust valve, selectively making the valve inoperative in accordance with the control signal to be supplied to the solenoid 24. The valve driving apparatus according to the present invention has at least two of the valve driving mechanism of this type.

Figure 5:
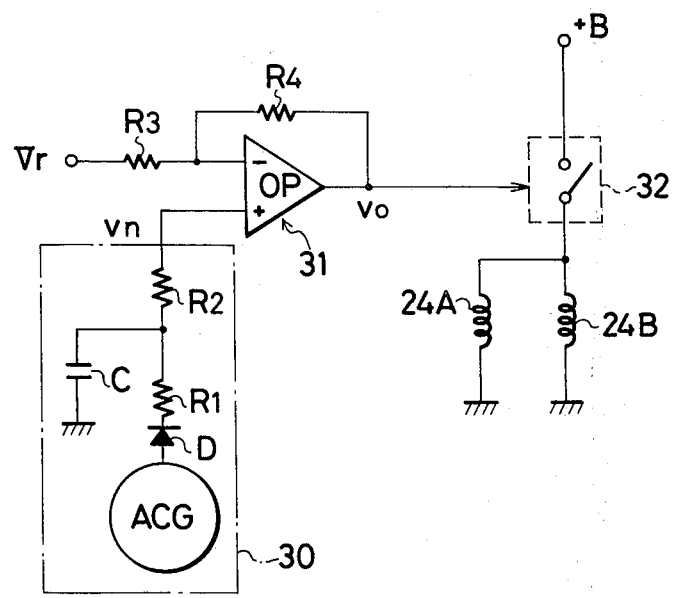
FIG. 5 is a circuit diagram showing a control circuit of the valve driving mechanism of the invention.
Figure 6:
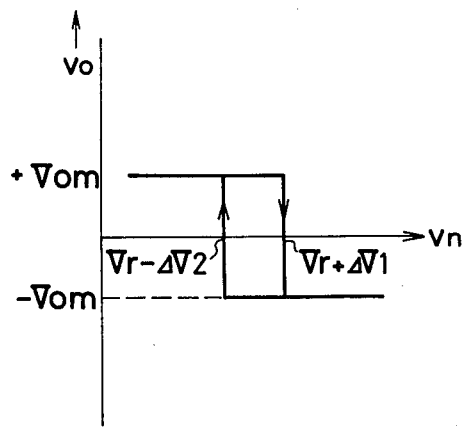
FIG. 6 is a graph showing the hysteresis characteristic of a part of the control circuit of FIG. 5.

Reference is now made to FIG. 5 which shows a control circuit for supplying control signals to the solenoid 24A of the valve driving mechanism of at least one of intake valves and to the solenoid 24B of the valve driving mechanism of at least one of exhaust valves of the valve driving control appratus according to the present invention. This control circuit comprises a rotational speed voltage generating circuit 30 for generating the rotational speed voltage $v_n$ representative of the engine rotational speed. The rotational speed voltage generating circuit 30 in this embodiment comprises an AC generator ACG which rotates with the revolution of the crankshaft, and a diode D, resistors $R_1$ and $R_2$, and a capacitor C which form a rectifier smoothing circuit to rectify and smooth the output of the AC generator. The rotational speed voltage generating circuit 30 outputs the rotational speed voltage $v_n$ as the input voltage which is applied to a positive input terminal of an operation amplifier OP. A reference voltage $v_r$ is applied to a negative input terminal of the operational amplifier OP through a resistor $R_3$. A feedback resistor $R_4$ is connected between the negative input terminal and the output terminal of the operational amplifier OP, and a compartor circuit 31 which is composed by the operational amplifier OP and resistors $R_3$ and $R_4$ has such a hysteresis characteristics as shown in FIG. 6. The comparator circuit 31 outputs the voltage $-V_{OM}$ corresponding to logic "0" when the input voltage $v_n$ exceeds the voltage $(V_r + \Delta V_1)$ and outputs the voltage $+V_{OM}$ corresponding to logic "1" when the input voltage $v_n$ is smaller than the voltage $(V_r - \Delta V_2)$. A switch 32 which is controlled by the output signal of the comparator circuit 31 is provided in the power circuit of the solenoids 24A and 24B. The switch 32 is closed when the voltage $v_0$ from the comparator 31 is at high voltage, i.e. logic "1", and consequently, solenoids 24A and 24B are energized to make the valve inoperative.

Figure 7:
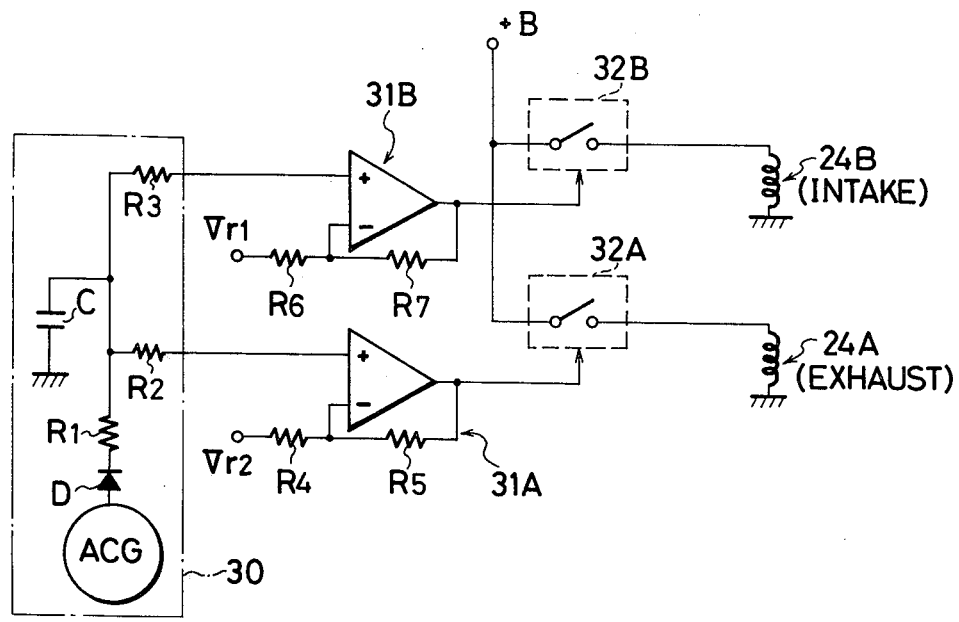
FIG. 7 is a circuit diagram showing another control circuit of the valve driving mechanism according to the present invention.

Reference is now made to FIG. 7, which shows another example of the control circuit in which the rotational speed at which the valve is made operative after the inoperative state is set at two different rotational speeds which are determined by reference voltages $V_{r1}$ and $V_{r2}$ depending on the type of valves, i.e., the intake valve or the exhaust valve. The circuit is characterized in that two solenoids 24A and 24B are respectively controlled by two switches 32A and 32B which are respectively closed by an output signal of comparators 31A and 31B.

Figure 8:
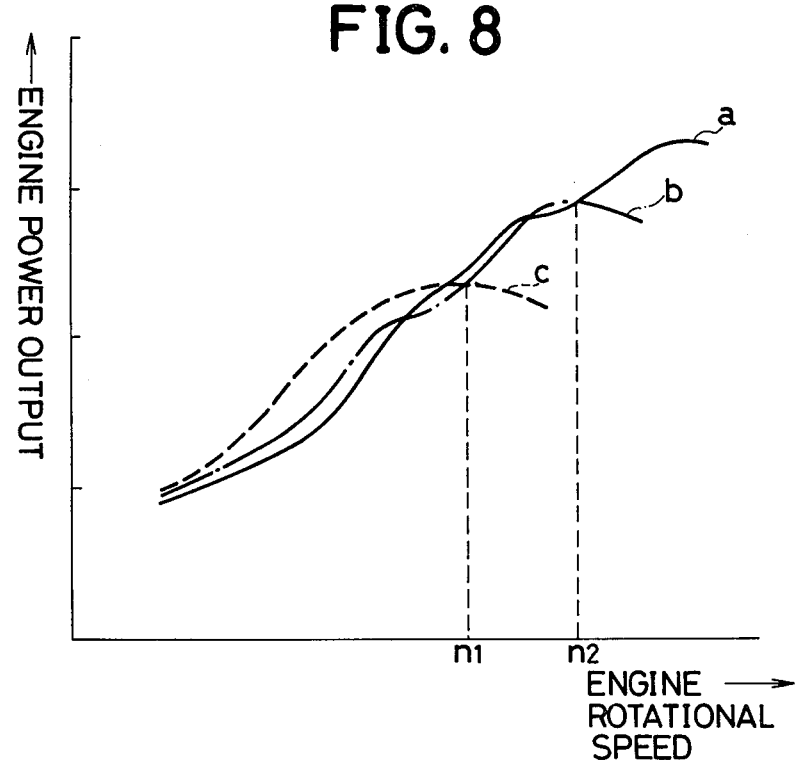
FIG. 8 is a graph showing the output characteristics of the internal combustion engine which is equipped with a plurality of intake and exhaust pwer each cylinder valves.

FIG. 8 shows the relationship between the change of engine power and the change of engine rotational speed in an internal combustion engine which is equipped with two intake valves and two exhaust valves per each power cylinders. In the drawing, a solid line 'a' indicates the engine power characteristic in the case where all of the intake and exhaust valves are made operative, a partly dotted line 'b' indicates the engine power characteristics in the case where only one of the exhaust valves is made inoperative and the both of the exhaust valves are made operative, and a dashed line 'c' indicates the engine power characteristic in the case where one of the valves and one of the exhaust valves are made inoperative and only the others of the intake and exhaust valves are made operative. As it is obvious from FIG. 8, the partly dotted line 'b' crosses the dashed line 'c' at an engine rotational speed $n_1$ and the solid line 'a' crosses the line 'b' at an engine rotational speed $n_2$.

Therefore, by setting the reference voltages $V_{r2}$ and $v_{r1}$ respectively at the engine rotational speeds $n_1$ and $n_2$ in the control circuit shown in FIG. 7, it is possible to obtain such power characteristics as shown by the dashed line 'c' when the engine rotational speed is lower than the speed $n_1$ and shown by the line 'b' when the engine rotational speed is between the speeds $n_1$ to $n_2$, and shown by the solid line 'a' when the engine rotational speed is higher than the speed $n_2$. It is further seen from FIG. 8 that the change of the power characteristics during the changing over of the valve operation from the inoperative state to the operative state is continuous, which is advantageous for eliminating an abrupt changes of the engine power which might be caused by switching of the valve operating states.

It will be readily appreciated from the foregoing that, according to the control circuits of the present invention shown in FIGS. 5 and 7, the frequency of switching operation is reduced since the switching operation between the inoperative and operative states of the valve is performed at around the predetermined threshold engine rotational speed with the hysteresis characteristic shown in FIG. 6, for example.

Thus the valve driving control apparatus according to the present invention can lengthen the service life thereof, and can reduce the engine noise at the same time.

With this detailed description of the specific apparatus used to illustrate the preferred embodiment of the present invention, it will be obvious to those skilled in the art that various modifications can be made in the present system described herein without departing from the spirit and scope of the invention which is limited only by the appended claims.

As an example, in the above-described embodiment, the hysteresis circuit using an operational amplifier has been employed; however, the present invention is not limited to this but it is needless to say that the circuits with various hysteresis characteristics may be also used.

What is claimed is:

1. A valve driving control apparatus for an internal combustion engine having a crankshaft and a power cylinder provided with a plurality of intake or exhaust valves, comprising:
   (a) an engine speed sensor means for generating an engine speed signal indicative of the rotational speed of the crankshaft;
   (b) a camshaft driven by the crankshaft;
   (c) a plurality of cam assembly means associated with said camshaft for opening one of the intake and exhaust valves in accordance with the rotation of said camshaft at a predetermined valve timing;
   (d) a change-over means associated with at least one of said cam assembly means for selectively disabling an operation of opening the valve upon receiving a valve drive control signal; and
   (e) a control means for producing said valve drive control signal in response to said engine speed signal, said control means being arranged to have a first threshold engine speed level which is used upon production of said valve drive control signal and a second threshold engine speed level which is used upon stopping of said valve drive control signal, thereby providing a hysteresis characteristic to a change-over operation between an operative and an inoperative state of the valve.

2. A valve driving control apparatus as claimed in claim 1, wherein said change-over means comprises a control cylinder means associated with said cam assembly, powered by a pressurized fluid source, and a solenoid means driven by said valve control signal for opening and closing a control valve provided in a passageway which communicates said pressurized fluid source to said control cylinder means.

3. A valve driving control apparatus as claimed in claim 1 or claim 2, wherein said engine speed sensor means comprises an AC generator driven by the crankshaft, a rectifying and smoothing circuit connected to said AC generator to produce said engine speed signal is response to an output signal of said AC generator.

4. A valve driving control apparatus as claimed in claim 3, wherein said rectifying and smoothing circuit comprises a series circuit of a diode and a resistor, connected to an output terminal of said AC generator, and a capacitor connected between an output terminal of said series circuit and the ground.

5. A valve driving control apparatus as claimed in claim 1 or claim 2, wherein said control means comprises an operational amplifier having a first input terminal for receiving said engine speed signal from said engine speed sensor means and a second input terminal for receiving a reference voltage signal and an output terminal for providing said valve drive control signal, and a resistor connected between said second input terminal and said output terminal of the operational amplifier.

* * * * *